United States Patent [19]

Bronstein

[11] Patent Number: 5,071,243
[45] Date of Patent: Dec. 10, 1991

[54] TENSIONED COVER FOR PARABOLIC REFLECTOR

[76] Inventor: Allen I. Bronstein, 1011 Sevier Ave., Menlo Park, Calif. 94025

[21] Appl. No.: 495,785

[22] Filed: Mar. 19, 1990

[51] Int. Cl.⁵ .............................. G02B 5/10; F24J 2/24
[52] U.S. Cl. .................................... 359/867; 126/438; 126/442; 126/443; 359/852; 359/869; 359/894; 359/514
[58] Field of Search ............... 350/613, 614, 628, 629, 350/630, 319; 150/165, 166; 224/42.2; 273/13; 126/438, 442, 443

[56] References Cited

U.S. PATENT DOCUMENTS

| | | | |
|---|---|---|---|
| 4,127,926 | 12/1978 | White | 350/628 |
| 4,205,659 | 6/1980 | Beam | 250/203.4 |
| 4,510,923 | 4/1985 | Bronstein | 350/625 |
| 4,543,946 | 10/1985 | Gill et al. | 126/438 |
| 4,561,424 | 12/1985 | Gill et al. | 126/438 |
| 4,596,238 | 6/1986 | Bronstein | 126/438 |
| 4,611,575 | 9/1986 | Powell | 126/438 |

Primary Examiner—Bruce Y. Arnold
Assistant Examiner—J. Ryan
Attorney, Agent, or Firm—Fliesler, Dubb, Meyer & Lovejoy

[57] ABSTRACT

A generally rectangular tensioned cover comprises a pair of end forms having end portions. They are generally parallel along their lengths. A pair of side rails which are generally orthogonal to the end forms have first and second end portions. They are spaced substantially the lateral separation of the end forms with the end portions of each side rail positioned adjacent the end portions of an end form. A tensionable sheet spans from one side rail to the other and from one end form to the other. The sheet's first end portions are attached along the end forms. The lateral peripheral portions of the sheet are attached along the side rails. The end portion of the one end form is fastened to the first end portions of the side rails. The end portion of the other end form is fastened to selectable regions of the second end portions of the side rails. The sheet is tensioned longitudinally between the end forms.

48 Claims, 5 Drawing Sheets

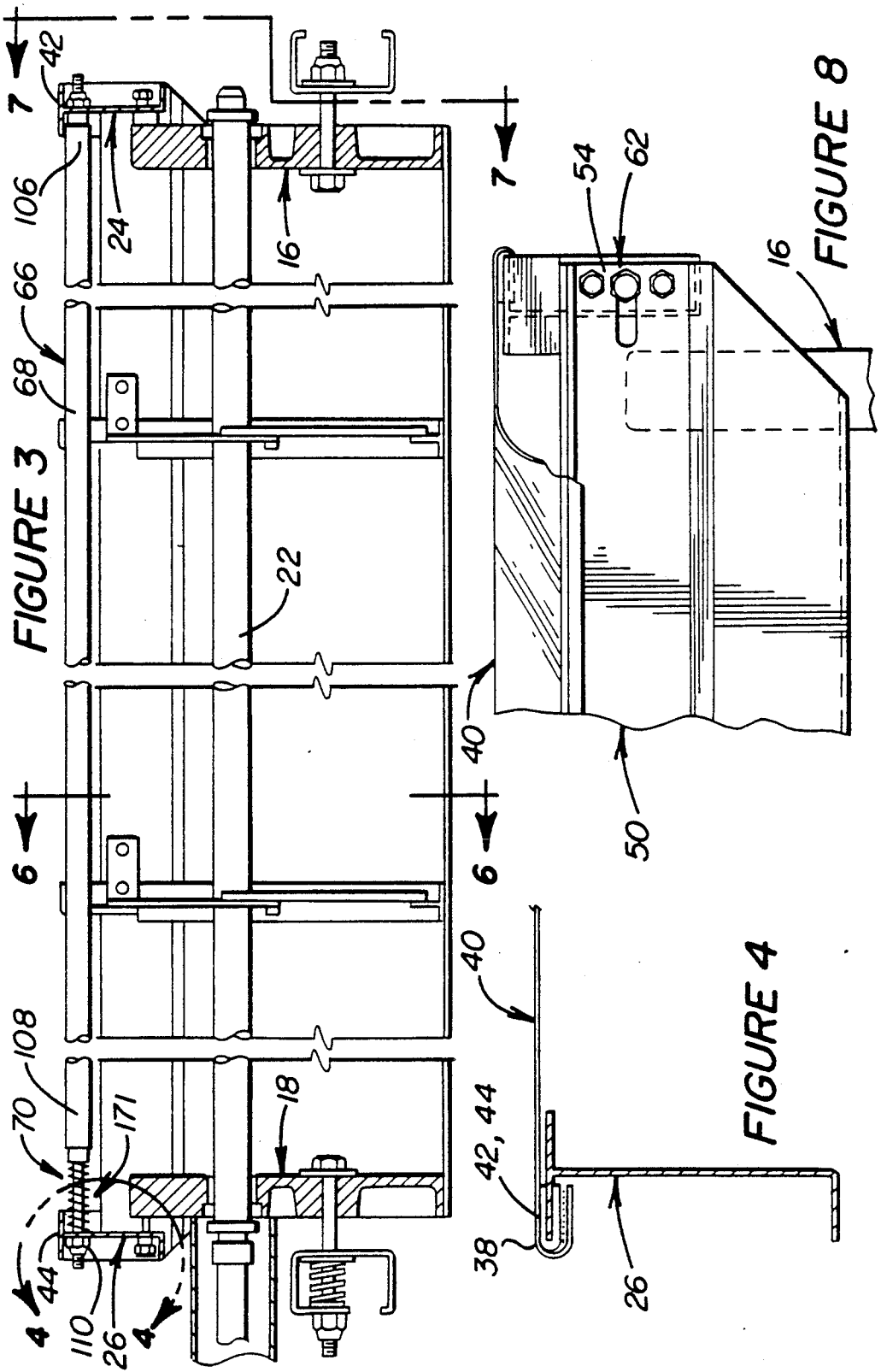

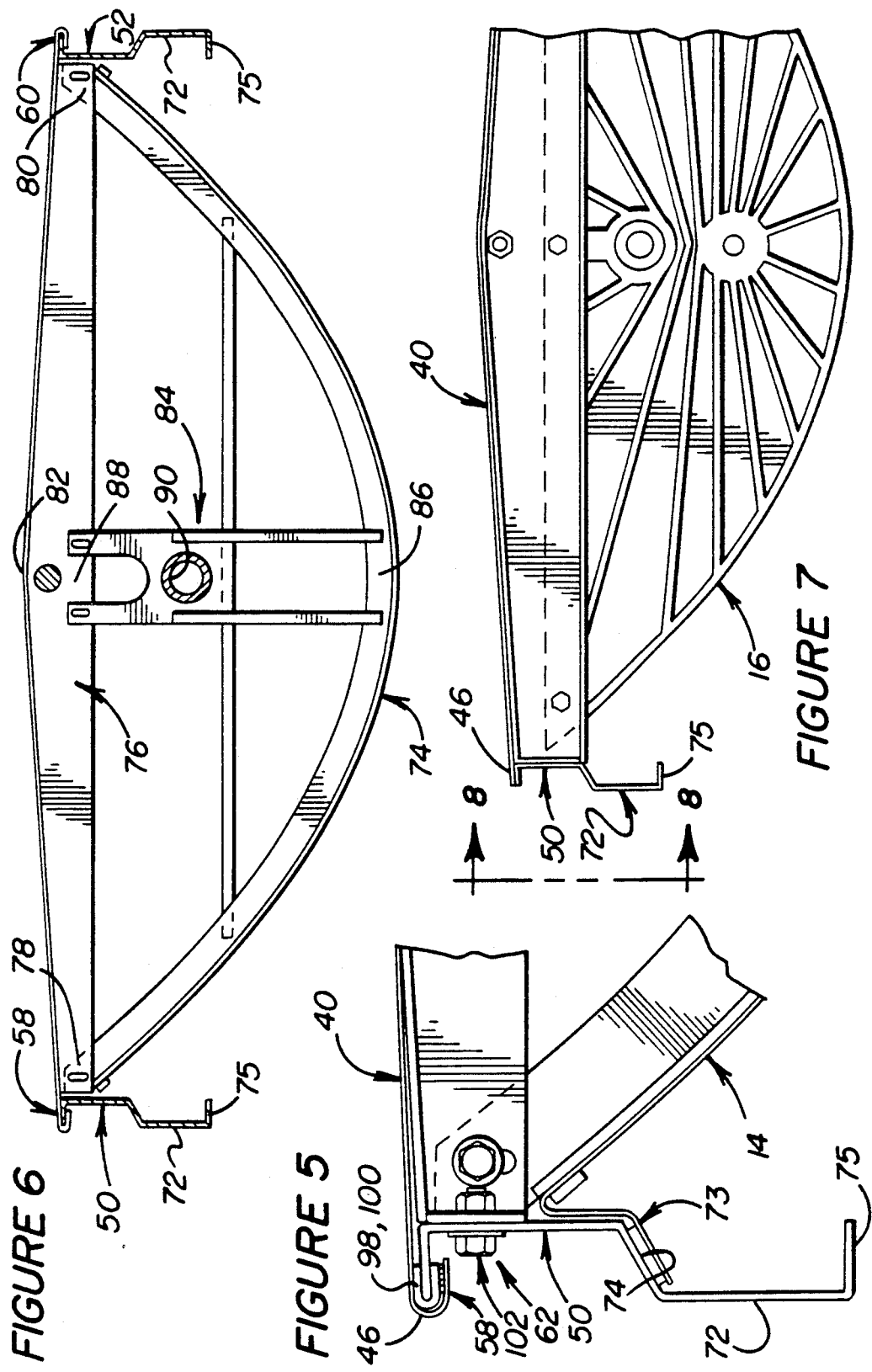

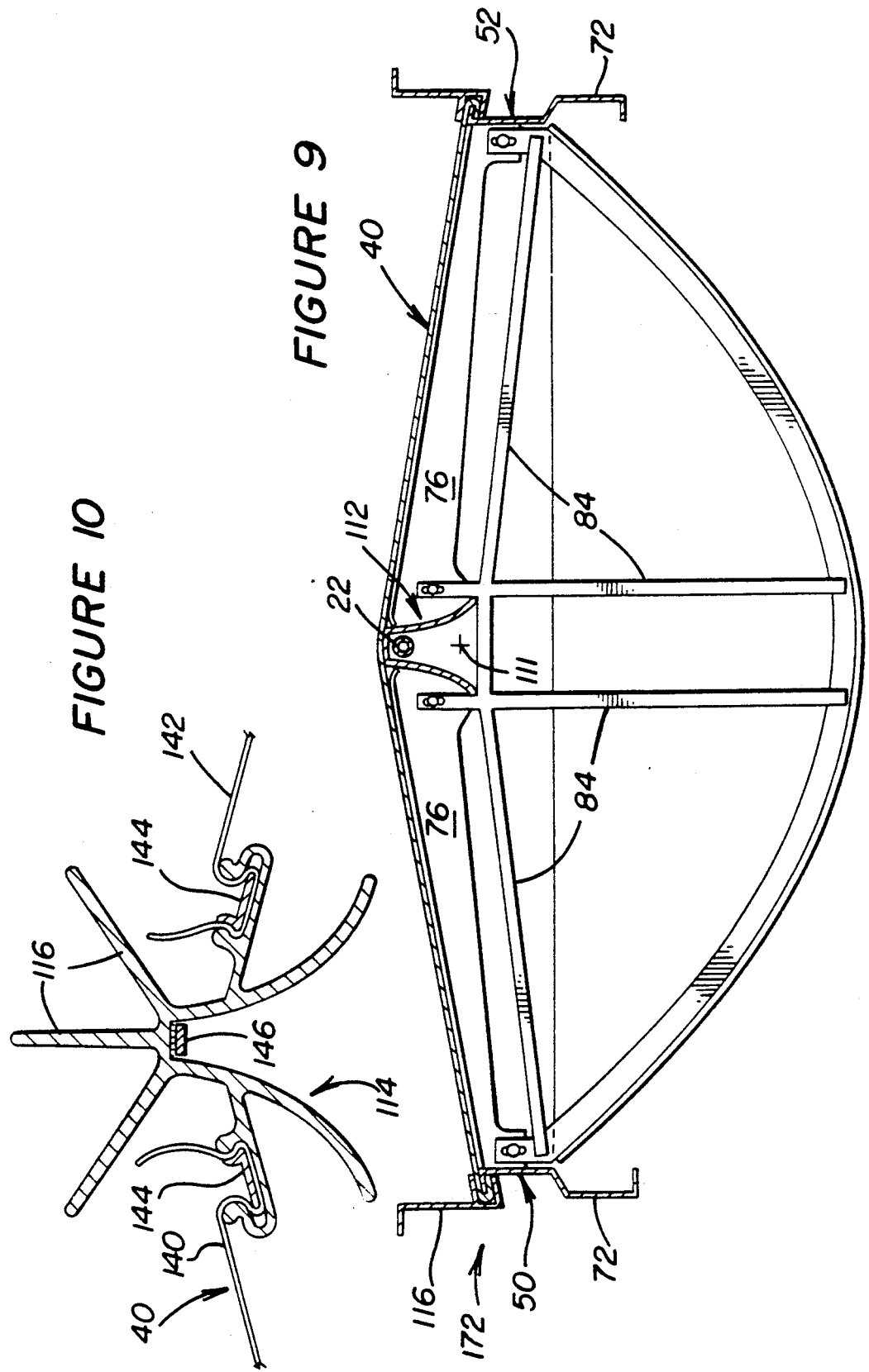

TENSIONED COVER FOR PARABOLIC REFLECTOR

TECHNICAL FIELD

The present invention relates to a generally rectangular tensioned cover which finds particular use as a cover for a parabolic solar reflector.

BACKGROUND OF THE INVENTION

Parabolic solar reflector troughs are used to focus the sun's rays upon a tube which runs along a focal line defined by the parabola. A liquid flowing through the tube can be heated to high temperature, for example, to about 700° F. Such reflectors face upwardly and are exposed to the elements, including wind, snow, dust, soot, pollutants and rain. It is accordingly necessary that they be covered with a transparent cover which will allow the sun's rays to pass into the parabolic reflector and be reflected onto the target pipe yet will keep rain, dust, snow and the like from contacting the parabolic reflector surface and will also keep winds from blowing too strongly into the structure defining the parabola so as to prevent or minimize wind damage.

A problem which exists with many prior art parabolic reflectors is that they are both heavy, thus making their installation on roofs and the like impossible in many instances without extensive bracing of the roofs, and expensive. The problem of producing relatively light weight and inexpensive parabolic reflectors has been partially solved by utilizing a parabolic reflector which is in the nature of a tensioned parabolic sheet having a reflective surface. This type of apparatus is disclosed, for example, in U.S. Pat. Nos. 4,596,238 issued June 24, 1986 and 4,510,923 issued Apr. 16, 1985. When one utilizes a tensioned sheet type of parabolic reflector it is particularly important to prevent winds, which may reach speeds of well in excess of eighty miles per hour, from damaging the reflector.

Another problem with prior art solar reflector covers has been that they have been relatively bulky to transport and relatively difficult to assemble. This has lead to increased cost.

The present invention is directed to overcoming one or more of the problems as set forth above.

DISCLOSURE OF INVENTION

In accordance with an embodiment of the present invention a generally rectangular tensioned cover is set forth. The cover comprises a pair of generally equal length end forms having respective end portions. The end forms are generally parallel along their lengths and are separated laterally a spaced distance apart from one another. The cover also includes a pair of generally equal length side rails having respective first and second end portions. The side rails are generally orthogonal to the end forms and are generally parallel along their length. They are spaced laterally apart from one another a distance substantially equal to the lateral separation of the end forms with the first end portion of each side rail positioned adjacent the end portions of a respective one of the end forms and with the second end portions of each side rail being positioned adjacent the end portions of a respective other of the end forms. A tensionable sheet has a first end portion, a second end portion and lateral peripheral portions. The sheet is of a width at least sufficient to span from one side rail to the other and of a length at least sufficient to span from one end form to the other. First attaching means serves for attaching the first end portion of the sheet along the one end form. Second attaching means serves for attaching the second end portion of the sheet along the other end form. Third attaching means serves for attaching a respective one of the lateral peripheral portions of the sheet along the respective one side rail. Fourth attaching means serves for attaching a respective other of the lateral peripheral portion of the sheet along the respective other side rail. First fastening means are present for fastening the end portion of the respective one end form to the first end portions of the side rails. Second fastening means serves for fastening the end portion of the respective other end form to selectable regions of the second end portions of the side rails. Tensioning means is provided for tensioning the sheet longitudinally between the end forms.

A cover as set forth above is very light in weight and can be shipped in the form of parallelly arranged unassembled end forms and side rails along with tensioning means, the rolled up tensionable sheet and needed assembly hardware. Assembly is quick and the resulting structure is wind resistant as well as being light in weight.

In accordance with another embodiment of the invention a method as set forth of forming a unitary covered solar reflector trough. The method comprises providing a solar reflector trough having a tensioned arcuate, generally parabolic, reflector sheet having a reflective infacing surface focused upon an absorber pipe and an open top. A frame structure comprising a pair of end forms and a pair of side rails is positioned with the side rails running along lateral edges of the reflector sheet and with said end forms running along the ends of the reflector sheet. One end of a transparent cover sheet is attached to one of the end forms. The other end of the transparent sheet is attached to the other end form. The separation of the end forms is adjusted to provide a selected tension in the transparent sheet from one end form to the other. The lateral peripheries of the transparent sheet are fastened to the side rails.

In accordance with a preferred embodiment of the present invention wind spoiler structures may extend from the side rails and may serve to protect the tensioned arcuate, generally parabolic, reflector sheet of a parabolic solar reflector from high winds.

In accordance with various embodiments of the present invention bracing structures are provided which serve to ensure the integrity of not only the cover but also of the solar trough which it covers and a hyperbolic reflector is provided to better focus solar rays.

BRIEF DESCRIPTION OF THE DRAWINGS

The invention will better understood by reference to the figures of the drawings wherein like numbers denote like parts throughout and wherein:

FIG. 3 illustrates, in side sectional view, with portions cut away, a solar trough having a cover in accordance with an embodiment of the present invention;

FIG. 4 illustrates, a detail in the construction of a solar trough having a cover in accordance with an embodiment of the present invention;

FIG. 5 illustrates, another detail in the construction of a solar trough having a cover in accordance with an embodiment of the present invention;

FIG. 6 illustrates, still another detail in the construction of a solar trough having a cover in accordance with an embodiment of the present invention;

FIG. 7 illustrates, in partial end view, yet another detail in the construction of a solar trough having a cover in accordance with an embodiment of the present invention;

FIG. 8 illustrates, another detail yet in the construction of a solar trough having a cover in accordance with an embodiment of the present invention;

FIG. 9 illustrates, an alternate embodiment of a covered solar trough in end view in accordance with an embodiment of the present invention; and FIG. 10 illustrates, in partial sectional view, an alternate structure which can be used in the construction of a solar trough having a cover in accordance with an embodiment of the present invention.

BEST MODE FOR CARRYING OUT INVENTION

Figure 1:
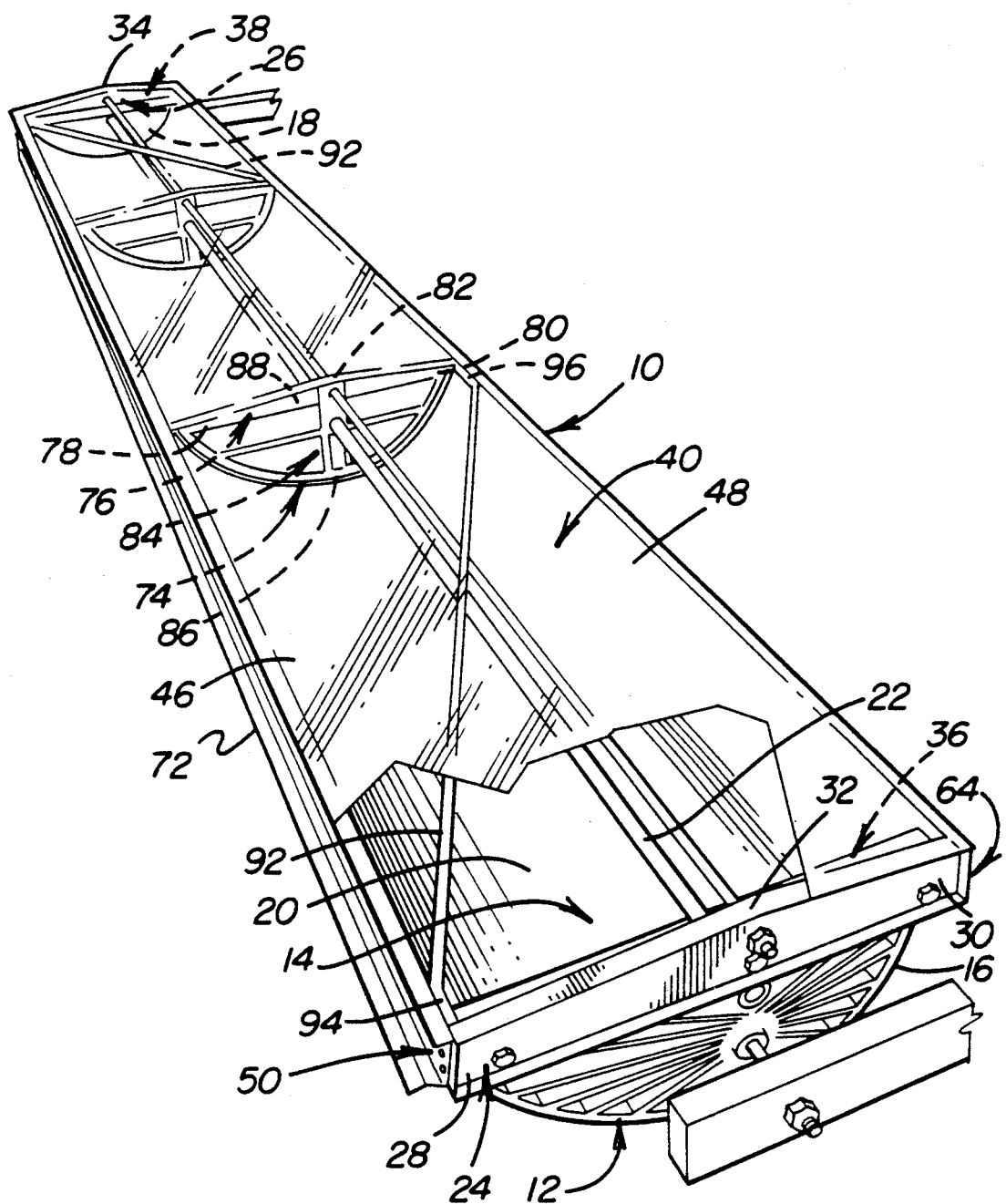
FIG. 1 illustrates, in isometric view taken from above, to one side and from one end, a solar trough having a cover in accordance with an embodiment of the present invention.

FIG. 1 illustrates a generally rectangular tensioned cover 10 in accordance with the present invention. The cover 10 is shown in covering relation to an arcuate, generally parabolic solar reflector 12 which includes a sheet 14 tensioned between two parabolically shaped end forms 16,18. The sheet 14 has a reflective infacing surface 20. The parabolic reflector 12 concentrates sunlight upon a receiver pipe 22 through which water or another liquid can be flowed. All of the structures described above are described in more detail in U.S. Pat. No. 4,510,923, issued to Allen I. Bronstein on Apr. 16, 1985. The disclosure of that patent is hereby incorporated herein in its entirety by reference thereto.

Figure 2:
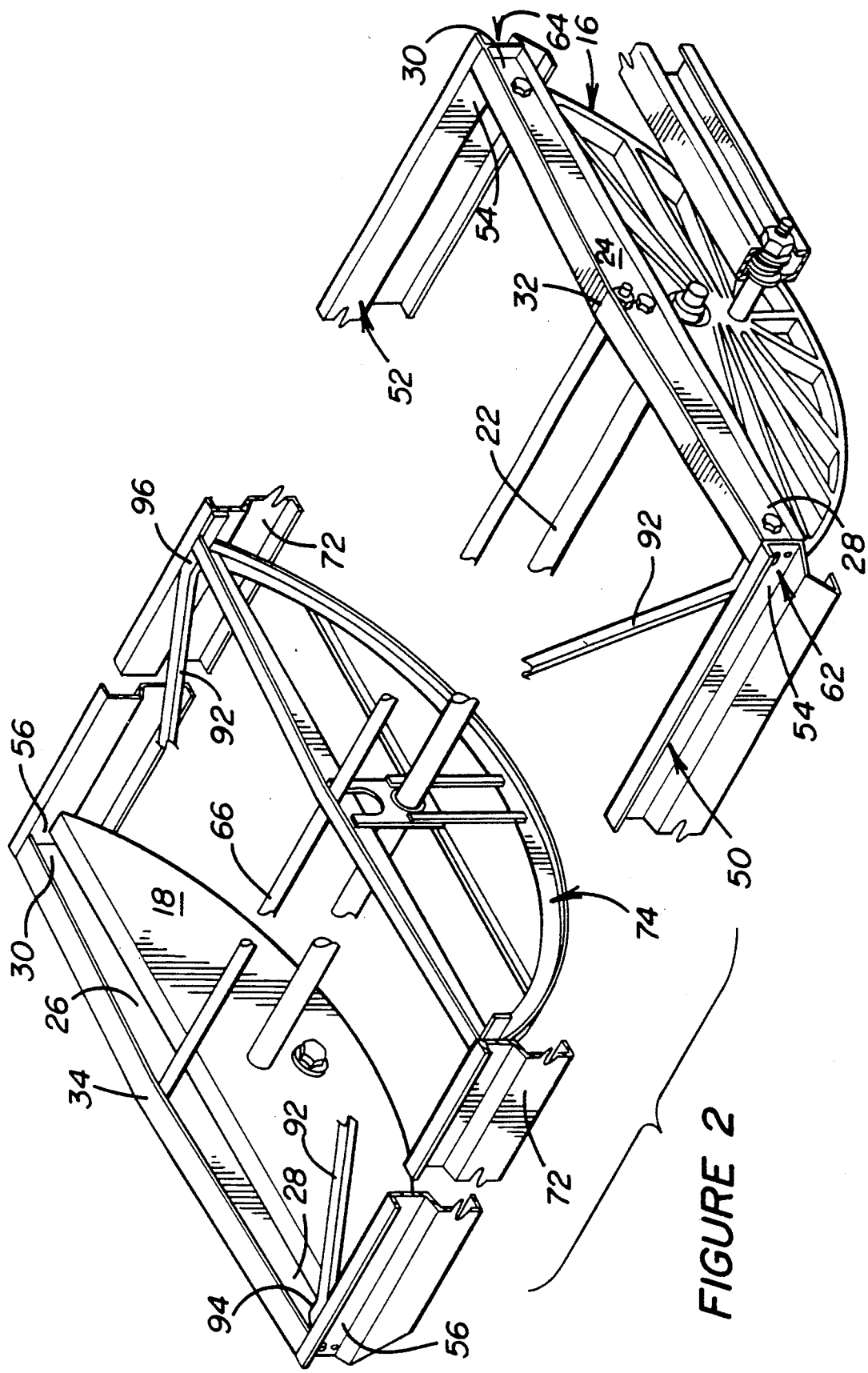
FIG. 2 illustrates, in an enlarged view similar to FIG. 1 but with the transparent covering sheet and reflective sheet removed and with portions cut away, a solar trough having a cover in accordance with an embodiment of the present invention.

In accordance with the present invention, and referring principally to FIGS. 1 and 2, a pair of generally equal length end forms 24,26 are provided which form a part of the cover 10. The end forms 24,26 each have respective end portions 28 and 30. The end forms 24,26 are generally parallel along their lengths and are separated laterally a spaced distance apart from one another, which spaced distance is generally slightly greater than the length of the solar reflector 12 from one parabolic end form 16 to the other parabolic end form 18.

The end forms 24,26 can suitably have central upfacing regions 32,34 to which a first end portion 36 or a second end portion 38 of a tensionable sheet 40 are attached by respective first attaching means 42 and second attaching means 44, preferred embodiments of which are illustrated more fully in FIG. 4. The attaching means can comprise an adhesive. The central upfacing regions 32,34 are shaped such that the sheet 40 extends further upwardly from a plane defined by the end forms 24,26 intermediate lateral peripheral portions 46,48 of the tensionable sheet 40 then the sheet 40 extends upwardly from that plane at the lateral peripheral portions 46,48.

A pair of generally equal length side rails 50,52 each have respective first and second end portions 54,56. The side rails 50,52 are generally orthogonal to the end forms 24,26. The side rails 50,52 are generally parallel along their lengths and are spaced laterally apart from one another a distance substantially equal to the lateral separation of the end forms 24,26. The first end portions 54 of each side rail 50,52 is positioned adjacent the end form end portion 28 of a respective one 24 of the end forms 24,26. The second end portion 56 of each side 24,26 is positioned adjacent the end form end portion 30 of a respective other 26 of the end forms 24,26.

The sheet 40 is of a width at least sufficient to span from one side rail 52 to the other 50 and is of a length at least sufficient to span from one end form 24 to the other 26. With reference to FIG. 5, third attaching means 58 is present for attaching a respective one of the lateral peripheral portions 46,48 of the sheet 40 along a respective one of the side rails 50,52. Fourth attaching means 60 is provided for attaching a respective other of the lateral peripheral portions 46,48 of the sheet 40 along the respective other side rail 50,52. The preferred third and fourth attaching means 58 and 60 are shown in detail in FIG. 5. In the embodiment illustrated each lateral peripheral portion 46,48 of the sheet 40 fits over an outwardly extending flange 59,61 of the respective side rail 50,52 and is fastened in place in a manner which is described below.

First fastening means 62 is provided for fastening the end form end portion 28 of the respective one end form 24 to the first end portions 54 of the side rails 50,52. Second fastening means 64 is provided for fastening the end form end portion 30 of the respective other end form 26 to selectable regions of the second end portions 56 of the side rails 50,52. At least one of these fastening means 62 and 64 allows for adjustment of the separation between the end forms 24 and 26. In the embodiment illustrated (see, for example, FIG. 8) the adjustment is provided by a nut-bolt arrangement 102 in combination with a longitudinally extending slot 103 through the second end portions 56 of the side rails 50,52.

Tensioning means 66, seen best in FIG. 3, are provided for tensioning the sheet 40 longitudinally between the end forms 24,26. In accordance with a preferred embodiment of the present invention the tensioning means 66 comprises a longitudinally extending rod 68 attached generally centrally to and extending between end forms 24,26 and moving means 70, in the embodiment illustrated a telescoping threaded rod 71 which threadably engages with the rod 68, for moving at least one of the end forms 24,26 relative to the rod 68 in the direction that the rod 68 extends. A spring 171 fits about the rod 71. The spring 171 is compressed during installation; when released the spring 171 tensions the sheet 40. Other tensioning means can alternatively be used. For example, the spring 171 can be omitted and tension can be provided by the extension of the threaded rods 68 and 71. The preferred rod 68 is tubular in construction to keep weight to a minimum.

It is preferred in accordance with the invention that wind spoiler structures 72 extend from the side rails 50,52 in a generally downward direction and along the exterior of the sides of the trough 12. Wind spoiler structures 72 serve to prevent the formation of eddies along the lateral peripheries 73 of the solar reflector sheet 14 which are in the nature of a skirt (The reflective portion of the sheet 14 and a covering protective coating generally do not extend fully to the edges of the sheet 14. Instead there is an uncoated and hence thinner flexible skirt which forms the lateral peripheries 73 of the sheet 14.) Also, the lateral peripheries 73 of the reflector sheet 14 can be attached to the infacing surfaces 74 of the wind spoiler structure 72 (see FIG. 5) to seal the overall structure whereby dust and dirt is excluded from it. Basically any eddies created by the wind are created at the unattached end 75 of the wind spoiler structure 72 whereby no eddying or creation of partial vacuum can significantly occur adjacent the thin film lateral peripheries 73 of the reflector sheet 14. The creation of such eddies and partial vacuums can lead to damage to the reflector sheet 14 during high wind conditions since the lateral peripheries 73 of the reflector sheet 14 are the areas most subject to wind damage.

The solar reflector trough 12, as previously discussed, includes the arcuate, generally parabolic (Note that the shape of the arcuate trough 12 is a matter of design choice and this shape may be parabolic, circular, etc., as desired by the designer and the term "arcuate" is meant to encompass any and all such shapes), solar reflector sheet 14 which has a focal line which extends parallel to the side rails 50,52. In accordance With an embodiment of the present invention there is at least one generally arcuately shaped rib 74 (see principally FIGS. 2 and 6) in contact with the infacing surface 20 of the arcuate reflector 14. An intermediate form 76 is also provided which has ends 78,80 attached to the rib 74 and has an upfacing central region 82 shaped and aligned with the upfacing central regions 32,34 of the end forms 24,26, the upfacing central region 82 of the intermediate form 76 serving to support the sheet 40 as seen in FIG. 1.

The solar reflector trough 12 generally includes the collector pipe 22, running along the focal line defined by the reflective sheet 14. A bracing structure 84 can be attached between a central portion 86 of the rib 74 and a central portion 88 of the intermediate form 76. The bracing structure 84 can include an opening 90 therethrough adapted to hold the collector pipe 22. When such a construction is utilized the cover 10 and the solar reflector trough 12 form a unitary structure which is highly resistant to wind damage, and which essentially completely seals the interior of the solar reflector 12 whereby the infacing reflective surface 20 is fully protected.

Since solar reflectors 12 and covers 10 as discussed above may be quite long from end to end, for example 10 to 20 feet in length, it is desirable to include, at times, one or more longitudinally extending cross braces 92, seen in FIGS. 1 and 2, having a first end 94 attached to a respective one of the side rails 50,52 at a position along the length thereof and having a second end 96 attached to a respective other of the side rails 50,52 at a position along the length thereof. The positions on the two side rails 50,52 are longitudinally spaced apart from one another. In this manner additional cross bracing is provided against the forces of nature.

In accordance with an embodiment of the present invention illustrated in FIG. 5 a pair of members 98,100 are provided, one attached along each of the side rails 50,52. The members 98,100 can be of any convenient and suitable material, for example, they can be made of plastic, an elastomeric material or metal. In such an instance the third attaching means 58 and the fourth attaching means 60 can serve to adhesively attach lateral peripheral portions 46,48 of the sheet 40 to the members 98,100.

In operation, the first end portions 54 of the side rails 50 and 52 are attached to the form end portions 28 and 30 of one of the end forms 24. The second end portions 56 of the side rails 50,52 are attached to the end portions 28 30 of the other end form 26. The attachment at the other end form 26 is such that the second end form 26 can be moved longitudinally along the side rails 50,52 a limited distance. This can be accomplished by providing the previously mentioned nut/bolt arrangement 102 in the appropriately shaped slot 103 (FIG. 8).

The first end portion 36 of the sheet 40 is attached to the first end form 24 and the second end portion 38 of the sheet 40 is attached to the other end form 26. Generally the sheet 40 will start out in the form of a roll and the necessary length of the sheet 40 will be rolled out and the sheet 40 will be severed from the roll. The tensioning means 66, in the nature of the tensioning rod 68 and spring 171 about rod 71, is already in position and is attached at a first end thereof 106 to the first end form 24 and at the other end 108 thereof to the other end form 26. Thereafter, the length of the rod 68 is adjusted by turning threaded rod 71 within a nut 110. Next, the nut/bolt arrangement 102 is tightened in place. The lateral peripheral portions 46,48 of the sheet 40 are tensioned by hand. The lateral peripheral portions 46,48 are attached to the respective side rails 50,52, for example by wrapping them over and about respective polymeric members 98,100 and are attached along the respective side rail 50,52 adhesively. Adhesive can be applied just before this attachments takes place or the adhesive can be in place and a protective backing can be removed from the adhesive to allow the aforementioned attachment.

FIG. 9 illustrates an embodiment wherein the focal line 111 along which the receiver pipe 22 lies is above the trough 12. A secondary arcuate light directing member 112 (Which in the embodiment illustrated is shown as being substantially hyperbolic but which can be any shape as required by a particular design, e.g., "V" shaped, a partial circle, an ellipse, a parabola or even a lens) is added which is supported by the end forms 24,26 and by rib bracing structure 84 and the intermediate form or forms 76, which in the embodiment of FIG. 9 extend considerably upwardly. This is to assure that any solar radiation which is not properly focused by the trough 12 is picked up by the relatively small arcuate light directing member 112. The light directing member 112 can serve as means to increase the concentration of the collector for high temperature applications. If the collector is concentrating light onto photovoltaic cells 146 as in the embodiment of FIG. 10 the light directing member 112 provides the more uniform flux of light on their surfaces that such cells 146 require. Thus, in that instance the light directing member 112 serves both to raise the concentration of the light and to provide a uniform distribution of light over the surfaces of the cells 146.

FIG. 10 shows an alternative light directing member 114 which includes radiating cooling vanes 116. In the embodiment of FIG. 10, like that of FIG. 9, the focal line 111 is above the solar reflector trough 12. In FIG. 10 the sheet 40 comes in two parts, 140 and 142, each of which is fastened to the light directing member 114 by an appropriate snap in bar 144. This embodiment is particularly useful if the solar reflector is being used to concentrate solar radiation on photovoltaic cells 146 which, in this embodiment, are aligned along the focus of the light directing member 114. The focus of the solar reflector trough 12 is such that the rays reflected by the solar reflector trough 12 fall on the infacing reflective surface of the illustrated reflective light directing member 114.

FIG. 9 also demonstrates how the light directing members 112,114 can be supported in place by a modification of the bracing structure 84 and of the intermediate form 76, which in the embodiment illustrated in FIG. 9 is in two parts (Modifications of the end forms 24,26 provides support for the ends of the light directing members 112,114). FIG. 9 also demonstrates the provision of a wind spoiler structure 172 which extends upwardly, as well as downwardly, from the trough 12 and which thereby serves to protect the lateral peripheral portions 46,48 of the sheet 40 from wind damage by insuring that any wind eddying must occur away from them. In the particular embodiment illustrated the wind spoiler structure 172 includes the downwardly extending wind spoiler 72 along with an upwardly extending wind spoiler 116 which fits over the lateral peripheral portions 42,44 of the sheet 40 where the sheet 40 fits about the upper flange portions 59,61 of the downwardly extending wind spoilers 72.

Industrial Applicability

The present invention provides a generally rectangular tensioned cover 10 particularly useful for covering a solar reflector trough 12 formed of a flexible reflector sheet 14.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A generally rectangular tensioned cover, comprising:
    a pair of generally equal length end forms having respective end form end portions, said end forms being generally parallel along their lengths and being separated laterally a spaced distance apart from one another;
    a pair of generally equal length side rails having respective first and second end portions, said side rails being generally orthogonal to said end forms, being generally parallel along their lengths and being spaced laterally apart from one another a distance substantially equal to the lateral separation of said end forms with the first end portions of each side rail positioned adjacent the end form end portions of a respective one of said end forms and with the second end portions of each side rail positioned adjacent the end form end portions of a respective other of said end forms;
    a tensionable sheet having a first end portion, a second end portion and lateral peripheral portions, said sheet being of a width at least sufficient to span from one side rail to the other and a length at least sufficient to span from one end form to the other;
    first attaching means for attaching said first end portion of said sheet along said one end form;
    second attaching means for attaching said second end portion of said sheet along said other end form;
    third attaching means for attaching a respective one of said lateral peripheral portions of said sheet along said respective one side rail;
    fourth attaching means for attaching a respective other of said lateral peripheral portions of said sheet along said respective other side rail;
    first fastening means for fastening said end form end portion of said respective one end form to said first end portions of said side rails;
    second fastening means for fastening said end form end portion of said respective other end form to selectable regions of said second end portions of said side rails; and
    tensioning means, including adjusting means for adjusting at least one of the end forms generally longitudinally along the side rails to provide a selectable separation between the end forms, for selectively stretching the sheet longitudinally and thereby tensioning said sheet longitudinally between said end forms.

2. A cover as set forth in claim 1, wherein said sheet is transparent and said cover is adapted to cover a generally arcuate solar reflector trough having ends along said end forms and sides along said side rails.

3. A cover as set forth in claim 2, wherein said trough includes an arcuate reflector having a focal line extending parallel to said side rails, and further including:
    a light directing member supported by said cover and positioned to concentrate light reflected by said arcuate reflector onto a focal area parallel to said focal line.

4. A cover as set forth in claim 3, further including a plurality of photovoltaic cells positioned on said focal area.

5. A cover as set forth in claim 3, further including a collector pipe positioned on said focal area.

6. A cover as set forth in claim 1, wherein said tensioning means comprises a longitudinally extending rod attached generally centrally to and extending between said end forms and means for moving at least one of said end forms in the direction said rod extends relative to said rod.

7. A cover as set forth in claim 6, wherein said rod is tubular in construction.

8. A cover as set forth in claim 6, wherein said tensioning means further includes a spring acting between said rod and one of said end forms.

9. A cover as set forth in claim 1, wherein said end forms each have a central region to which said end portions of said sheet are attached by said attaching means, said central region being shaped such that said sheet extends further from a plane defined by said end forms and said side rails intermediate said lateral peripheral portions than at said lateral peripheral portions.

10. A cover as set forth in claim 1, further including:
    a longitudinally extending cross brace having a first end attached to said respective one side rail at a position along the length thereof and a second end attached to said respective other side rail at a position along the length thereof, said positions on said side rails being longitudinally spaced apart from one another.

11. A generally rectangular tensioned cover adapted to cover a generally arcuate solar reflector trough having ends and sides, comprising:
    a pair of generally equal length end forms having respective end form end portions, said end forms being generally parallel along their lengths, being separated laterally a spaced distance apart from one another and being aligned along the trough ends;

a pair of generally equal length side rails having respective first and second end portions, said side rials being generally orthogonal to said end forms, being aligned along the trough sides, being generally parallel along their lengths and being spaced laterally apart from one another a distance substantially equal to the lateral separation of said end forms with the first end portions of each side rail positioned adjacent the end form end portions of a respective one of said end forms and with the second end portions of each side rail positioned adjacent the end form end portions of a respective other of said end forms;

a tensionable transparent sheet having a first end portion, a second end portion and lateral peripheral portions, said sheet being of a width at least sufficient to span from one side rail to the other and a length at least sufficient to span from one end form to the other;

first attaching means for attaching said first end portion of said sheet along said one end form;

second attaching means for attaching said second end portion of said sheet along said other end form;

third attaching means for attaching a respective one of said lateral peripheral portions of said sheet along said respective one side rail;

fourth attaching means for attaching a respective other of said lateral peripheral portions of said sheet along said respective other side rail;

first fastening means for fastening said end form end portion of said respective one end form to said first end portions of said side rails;

second fastening means for fastening said end form end portion of said respective other end form to selectable regions of said second end portions of said side rails; and tensioning means for tensioning said sheet longitudinally between said end forms; and wind spoiler structures attached to and extending downwardly from said side rails in a direction away from said sheet and along said sides of said trough.

12. A cover as set forth in claim 11, wherein said wind spoiler structure also extends upwardly from said side rails in a direction away from said sheet.

13. A cover as set forth in claim 11, wherein said trough includes an arcuate reflector having a focal line extending parallel to said side rails and at least one generally arcuately shaped rib in contact with said arcuate reflector; and further including:

an intermediate form having ends attached to said rib and having a central region shaped and aligned with said central regions of said end forms, said central region of said intermediate form supporting said sheet.

14. A cover as set forth in claim 13, wherein said trough includes a collector pipe running along said focal line, and further including:

a bracing structure attached between a central portion of said rib and a central portion of said intermediate form, said bracing structure including an opening therethrough adapted to hold said collector pipe.

15. A cover as set forth in claim 14, wherein said tensioning means comprises a longitudinally extending rod attached generally centrally to and extending between said end forms and means for moving at least one of said end forms in the direction said rod extends relative to said rod.

16. A cover as set forth in claim 15, wherein said rod is tubular in construction.

17. A cover as set forth in claim 16, wherein said end forms each have a central region to which said end portions of said sheet are attached by said attaching means, said central region being shaped such that said sheet extends further upwardly from a plane defined by said end forms and said side rails intermediate said lateral peripheral portions than at said lateral peripheral portions.

18. A cover as set forth in claim 17, further including:

a longitudinally extending cross brace having a first end attached to said respective one side rail at a position along the length thereof and a second end attached to said respective other side rail at a position along the length thereof, said positions on said side rails being longitudinally spaced apart from one another.

19. A cover as set forth in claim 18, further including:

a pair of members, one attached along each of said side rails; and wherein said third and fourth attaching means adhesively attach said lateral peripheries of said sheet to said members.

20. A cover as set forth in claim 15, wherein said tensioning means further includes a spring acting between said rod and one of said end forms.

21. A generally rectangular tensioned cover adapted to cover a generally arcuate solar reflector trough having ends and sides, comprising:

a pair of generally equal length end forms having respective end form end portions, said end forms being generally parallel along their lengths, being separated laterally a spaced distance apart from one another and being aligned along the trough ends;

a pair of generally equal length side rails having respective first and second end portions, said side rails having being generally orthogonal to said end forms, being aligned along the trough sides, being generally parallel along their lengths and being spaced laterally apart from one another a distance substantially equal to the lateral separation of said end forms with the first end portions of each side rail positioned adjacent the end form end portions of a respective one of said end forms and with the second end portions of each side rail positioned adjacent the end form end portions of a respective other of said end forms;

a tensionable transparent sheet having a first end portion, a second end portion and lateral peripheral portions, said sheet being of a width at least sufficient to span from one side rail to the other and a length at least sufficient to span from one end form to the other;

first attaching means for attaching said first end portion of said sheet along said one end form;

second attaching means for attaching said second end portion of said sheet along said other end form;

third attaching means for attaching a respective one of said lateral peripheral portions of said sheet along said respective one side rail;

fourth attaching means for attaching a respective other of said lateral peripheral portions of said sheet along said respective other side rail;

first fastening means for fastening said end form end portion of said respective one end form to said first end portions of said side rails;

second fastening means for fastening said end form end portion of said respective other end form to selectable regions of said second end portions of said side rails: and tensioning means for tensioning said sheet longitudinally between said end forms; and wherein said trough includes an arcuate reflector having a focal line extending parallel to said side rails and at least one generally arcuately shaped rib in contact with said arcuate reflector; and further including:

an intermediate form having ends attached to said rib and having a central region shaped and aligned with said central regions of said end forms, said central region of said intermediate form supporting said sheet.

22. A cover as set forth in claim 21, wherein said trough includes a collector pipe running along said focal line, and further including:

a bracing structure attached between a central portion of said rib and a central portion of said intermediate form, said bracing structure including an opening therethrough adapted to hold said collector pipe.

23. A cover as set forth in claim 22, wherein said tensioning means comprises a longitudinally extending rod attached generally centrally to and extending between said end forms and means for moving at least one of said end forms in the direction said rod extends relative to said rod.

24. A cover as set forth in claim 23, wherein said rod is tubular in construction.

25. A cover as set forth in claim 23, wherein said tensioning means further includes a spring acting between said rod and one of said end forms.

26. A cover as set forth in claim 23, wherein said end forms each have a central region to which said end portions of said sheet are attached by said attaching means, said central region being shaped such that said sheet extends further from a plane defined by said end forms and said side rails intermediate said lateral peripheral portions than at said lateral peripheral portions.

27. A cover as set forth in claim 26, further including:

a longitudinally extending cross brace having a first end attached to said respective one side rail at a position along the length thereof and a second end attached to said respective other side rail at a position along the length thereof, said positions on said side rails being longitudinally spaced apart from one another.

28. A cover as set forth in claim 27, further including:

a pair of members, one attached along each of said side rails; and wherein said third and fourth attaching means adhesively attach said lateral peripheries of said sheet to said members.

29. A cover as set forth in claim 22, wherein said tensioning means comprises a longitudinally extending rod attached generally centrally to and extending between said end forms and means for moving at least one of said end forms in the direction said rod extends relative to said rod.

30. A cover as set forth in claim 29, wherein said rod is tubular in construction.

31. A cover as set forth in claim 29, wherein said tensioning means further includes a spring acting between said rod and one of said end forms.

32. A cover as set forth in claim 29, wherein said end forms each have a central region to which said end portions of said sheet are attached by said attaching means, said central region being shaped such that said sheet extends further from a plane defined by said end forms and said side rails intermediate said lateral peripheral portions than at said lateral peripheral portions.

33. A cover as set forth in claim 32, further including:

a longitudinally extending cross brace having a first end attached to said respective one side rail at a position along the length thereof and a second end attached to said respective other side rail at a position along the length thereof, said positions on said side rails being longitudinally spaced apart from one another.

34. A cover as set forth in claim 33, further including:

a pair of members, one attached along each of said side rails; and wherein said third and fourth attaching means adhesively attach said lateral peripheries of said sheet to said members.

35. A cover as set forth in claim 21, further including:

a light directing member supported by said intermediate form and positioned to concentrate light reflected by said arcuate reflector onto a focal area parallel to said focal line.

36. A generally rectangular tensioned cover, comprising:

a pair of generally equal length end forms having respective end form end portions, said end forms being generally parallel along their lengths and being separated laterally a spaced distance apart from one another;

a pair of generally equal length side rails having respective first and second end portions, said side rails having being generally orthogonal to said end forms, being generally parallel along their lengths and being spaced laterally apart from one another a distance substantially equal to the lateral separation of said end forms with the first end portions of each side rail positioned adjacent the end form end portions of a respective one of said end forms and with the second end portions of each side rail positioned adjacent the end form end portions of a respective other of said end forms;

a tensionable sheet having a first end portion, a second end portion and lateral peripheral portions, said sheet being of a width at least sufficient to span from one side rail to the other and a length at least sufficient to span from one end form to the other;

first attaching means for attaching said first end portion of said sheet along said one end form;

second attaching means for attaching said second end portion of said sheet along said other end form;

third attaching means for attaching a respective one of said lateral peripheral portions of said sheet along said respective one side rail;

fourth attaching means for attaching a respective other of said lateral peripheral portions of said sheet along said respective other side rail;

first fastening means for fastening said end form end portion of said respective one end form to said first end portions of said side rails;

second fastening means for fastening said end form end portion of said respective other end form to selectable regions of said second end portions of said side rails;

tensioning means for tensioning said sheet longitudinally between said end forms;

a pair of members, one attached along each of said side rails; and wherein said third and fourth attaching means adhesively attach said lateral peripheries of said sheet to said members.

37. A solar reflector structure, comprising:

a solar reflector trough having a tensioned arcuate reflector sheet having a reflective infacing surface focused upon a focal line and an open top; and a generally rectangular tensioned cover which covers said trough and which comprises:

a pair of generally equal length end forms having respective end form end portions, said end forms being generally parallel along their lengths and being separated laterally a spaced distance apart from one another;

a pair of generally equal length side rails having respective first and second end portions, said side rails being generally orthogonal to said end forms, being generally parallel along their lengths and being spaced laterally apart from one another a distance substantially equal to the lateral separation of said end forms with the first end portions of each side rail positioned adjacent the end form end portions of a respective one of said end forms and with the second end portions of each side rail positioned adjacent the end form end portions of a respective other of said end forms;

a tensionable sheet having a first end portion, a second end portion and lateral peripheral portions, said sheet being of a width at least sufficient to span from one side rail to the other and a length at least sufficient to span from one end form to the other;

first attaching means for attaching said first end portion of said sheet along said one end form;

second attaching means for attaching said second end portion of said sheet along said other end form;

third attaching means for attaching a respective one of said lateral peripheral portions of said sheet along said respective one side rail;

fourth attaching means for attaching a respective other of said lateral peripheral portions of said sheet along said respective other side rail;

first fastening means for fastening said end form end portion of said respective one end form to said first end portions of said side rails;

second fastening means for fastening said end form end portion of said respective other end form to selectable regions of said second end portions of said side rails; and tensioning means, including adjusting means for adjusting at least one of the end forms generally longitudinally along the side rails to provide a selectable separation between the end forms, for selectively tensioning said sheet longitudinally between said end forms.

38. A solar reflector as set forth in claim 37, wherein said tensioning means comprises a longitudinally extending rod attached generally centrally to and extending between said end forms and means for moving at least one of said end forms in the direction said rod extends relative to said rod.

39. A solar reflector as set forth in claim 3B, wherein said rod is tubular in construction.

40. A solar reflector as set forth in claim 38, wherein said tensioning means further includes a spring acting between said rod and one of said end forms.

41. A solar reflector as set forth in claim 38, wherein said end forms each have a central region to which said end portions of said sheet are attached by said attaching means, said central region being shaped such that said sheet extends further from a plane defined by said end forms and said side rails intermediate said lateral peripheral portions than at said lateral peripheral portions.

42. A solar reflector as set forth in claim 37, further including:

a light directing member supported by said cover and positioned to concentrate light reflected by said arcuate reflector sheet onto a focal area parallel to said focal line.

43. A solar reflector as set forth in claim 42, further including a plurality of photovoltaic cells positioned on said focal area.

44. A solar reflector as set forth in claim 42, further including a collector pipe positioned on said focal area.

45. A solar reflector structure, comprising:

a solar reflector trough having a tensioned arcuate reflector sheet having a reflective infacing surface focused upon a focal line and an open top; and a generally rectangular tensioned cover which covers said trough and which comprises:

a pair of generally equal length end forms having respective end form end portions, said end forms being generally parallel along their lengths and being separated laterally a spaced distance apart from one another;

a pair of generally equal length side rails having respective first and second end portions, said side rails being generally orthogonal to said end forms, being generally parallel along their lengths and being spaced laterally apart from one another a distance substantially equal to the lateral separation of said end forms with the first end portions of each side rail positioned adjacent the end form end portions of a respective one of said end forms and with the second end portions of each side rail positioned adjacent the end form end portions of a respective other of said end forms;

a tensionable sheet having a first end portion, a second end portion and lateral peripheral portions, said sheet being of a width at least sufficient to span from one side rail to the other and a length at least sufficient to span from one end form to the other;

first attaching means for attaching said first end portion of said sheet along said one end form;

second attaching means for attaching said second end portion of said sheet along said other end form;

third attaching means for attaching a respective one of said lateral peripheral portions of said sheet along said respective one side rail;

fourth attaching means for attaching a respective other of said lateral peripheral portions of said sheet along said respective other side rail;

first fastening means for fastening said end form end portion of said respective one end form to said first end portions of said side rails;

second fastening means for fastening said end form end portion of said respective other end form to selectable regions of said second end portions of said side rails;

tensioning means for tensioning said sheet longitudinally between said end forms;

a pair of members, one attached along each of said side rails; and wherein said third and fourth attaching means adhesively attach said lateral peripheries of said sheet to said members.

46. A method of forming a unitary covered solar reflector trough, comprising:

providing a solar reflector trough having a tensioned arcuate reflector sheet having a reflective infacing surface focused upon a focal line and an open top;

positioning a frame structure comprising a pair of end forms and a pair of side rails with said side rails running along lateral edges of said reflector sheet and with said end forms running along the ends of said reflector sheet;

attaching one end of a transparent cover sheet to one of the end forms;

attaching the other end of said transparent sheet to the other end form;

adjusting the separation of said end forms to provide a selected tension in said transparent sheet from one end form to the other; and attaching the lateral peripheries of said transparent sheet to said side rails.

47. A method as set forth in claim 46, further including, prior to attaching said transparent sheet to said other end form:

attaching at least one arcuate rib along the infacing surface of said reflective sheet;

attaching an intermediate form from one side rail to the other in contact with an infacing surface of said transparent sheet in alignment with said rib; and attaching a support structure between a central portion of said intermediate form and a central portion of said rib.

48. A method as set forth in claim 47, wherein said solar trough further includes an absorber pipe along said focal line and further including:

supporting said absorber pipe with said support structure.

* * * * *